United States Patent [19]

Daniell et al.

[11] Patent Number: 4,760,219
[45] Date of Patent: Jul. 26, 1988

[54] INCREMENTAL TIMER DRIVE MECHANISM

[75] Inventors: Fred M. Daniell, Atlanta, Ga.; Charles F. Malone, Franklin, Tenn.

[73] Assignee: The Scott & Fetzer Company, Fairview, Tenn.

[21] Appl. No.: 56,002

[22] Filed: Jun. 1, 1987

[51] Int. Cl.⁴ .................. H01H 7/08; F16H 29/12
[52] U.S. Cl. .................. 200/35 R; 74/125; 200/38 R
[58] Field of Search .............. 200/35 R, 38 R, 38 B, 200/38 BA, 38 C, 38 CA, 38 D, 34 R; 74/116, 124, 125, 160

[56] References Cited

U.S. PATENT DOCUMENTS 3,738,185  6/1973  Wooley ............................... 74/116
4,579,014  4/1986  Malone ............................... 74/125
4,599,499  7/1986  Duve ............................. 200/38 R X Primary Examiner—J. R. Scott
Attorney, Agent, or Firm—Pearne, Gordon, McCoy & Granger

[57] ABSTRACT

An incremental drive mechanism for a switch operating timing cam is disclosed. The mechanism includes a camshaft having a radially extending cam and a cooperating slide which is adapted to reciprocate along a rectilinear path. The slide has first and second cam surfaces which are engaged during a major portion of a single revolution of the camshaft to reciprocate the slide in a positive manner. The slide has a cantilever spring arm which carries a pawl tooth at its end to engage successive teeth provided on the periphery of a switch operating cam drum or disc.

8 Claims, 4 Drawing Sheets

INCREMENTAL TIMER DRIVE MECHANISM

BACKGROUND OF THE INVENTION

This invention relates to timing mechanisms, and more particularly to drive mechanisms for incrementally advancing the timing cam of an appliance timer.

Although the principles of the present invention may be included in various timers, a particular application is made in timers of the type employed to control the various circuits and functions of automatic laundry appliances, such as washers and dryers. Appliance timers basically comprise a rotatable member having a plurality of projecting cams which sequentially engage switch members, which, in turn, control the various operations of the appliance.

Basically, there are two types of timers for home appliances. One such timer is a cylindrical, rotary drum having a plurality of cams projecting from its surface which engage switch members, and is quite similar to a music box. An example of such an arrangement is shown in U.S. Pat. No. 3,395,585. Another such timer is described in U.S. Pat. No. 2,703,347. In the latter-mentioned patent, the timing cam comprises a flat disc mounted in a housing and having ratchet teeth on its periphery. The disc is driven incrementally about a central shaft by a pawl, which in turn is driven in a reciprocal manner by a synchronous motor. At least one face of the disc is provided with arcuate cam surfaces which are concentrically arranged about the face or faces of the disc. Switch members are arranged to engage the arcuate cam members upon rotation of the disc, and control various cycles of the appliance.

While the teachings of the present invention are set forth herein with particular reference to a disc cam, it is to be understood that the invention may also be employed as a drive mechanism for a drum cam. In either case, it is desirable that the disc or drum be driven at a very slow rate of advance, since one rotation of the disc or drum should complete at least one entire cycle of the machine.

A wide variety of mechanisms have been proposed for advancing the cam disc or drum in a step-by-step manner. Generally, all of these mechanisms include an array of ratchet teeth circularly arranged at the periphery of the disc or at the end of the drum which are engaged by a drive pawl and a "no-back" pawl which prevents reverse rotation of the ratchet teeth when the advancing pawl is retracted. The advancing pawl is incrementally driven by a cam or crank mechanism, and is retracted by a cam or spring mechanism while both pawls are biased against the periphery of the ratchet by coil or cantilever wire springs. An example of a cantilever spring biasing the drive pawl into engagement with the ratchet may be found in U.S. Pat. No. 3,738,185 and an example of coil springs biasing the drive pawl into engagement with the ratchet may be found in U.S. Pat. No. 4,579,014. As may be appreciated from these patents, the assembly techniques involve precise hand operations and careful handling of the timer until the timer is fully assembled. Moreover, such springs tend to become displaced if the timer is jarred during installation or use.

SUMMARY OF THE INVENTION

This invention provides an incremental drive mechanism for a switch operating timing cam. The drive mechanism includes a cam-driven slide which is mounted for reciprocation in a path which is tangential to a portion of the program cam having circularly arranged ratchet teeth. The slide has a body portion and has a pawl arm portion which comprises a cantilever spring arm having a pawl tooth at its distal end biased into engagement with the ratchet teeth. The body portion of the slide has first and second cam follower surfaces which are sequentially engaged by a radially extending cam portion of a camshaft which is rotationally driven by a timer motor through a suitable set of reduction gears.

Engagement of the first cam surface by the radially extending cam causes the slide to be driven rectilinearly, and causes said pawl to be driven along a rectilinear path in a first direction tangential to the ratchet teeth, to drive the teeth and the program cam through an arc corresponding to the arcuate width of an engaged tooth. The second cam surface of the slide, when engaged by the radially extending cam, causes the slide to be driven rectilinearly and the pawl to be driven along a path in a second direction following the contour of at least one ratchet tooth as the pawl is biased against the ratchet tooth by the cantilever spring arm. A retention or no-back pawl is provided to prevent the ratchet teeth from moving in the second direction as the pawl follows the contour of the engaged ratchet tooth.

An important aspect of the present invention is the fact that the slide is positively driven in its forward and reverse directions by a cam as opposed to an arrangement wherein movement is permitted by a cam which resists spring-biasing exerted on the slide. Furthermore, the cam and its cam followers are arranged so that the cam is in engagement with a cam follower during a major portion of an entire revolution of the cam, as opposed to prior art devices where the cam is out of driving contact with a cam follower for up to 180 degrees of rotation.

DETAILED DESCRIPTION OF THE INVENTION

Figure 1:
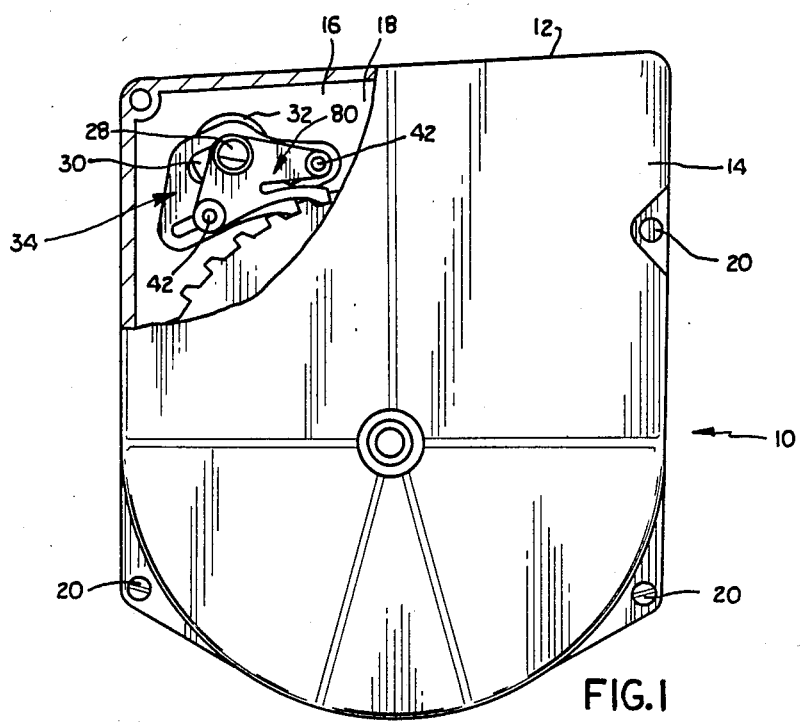
FIG. 1 is a plan view of a timer according to this invention, with portions of the timer broken away to show details of the operation.
Figure 2:
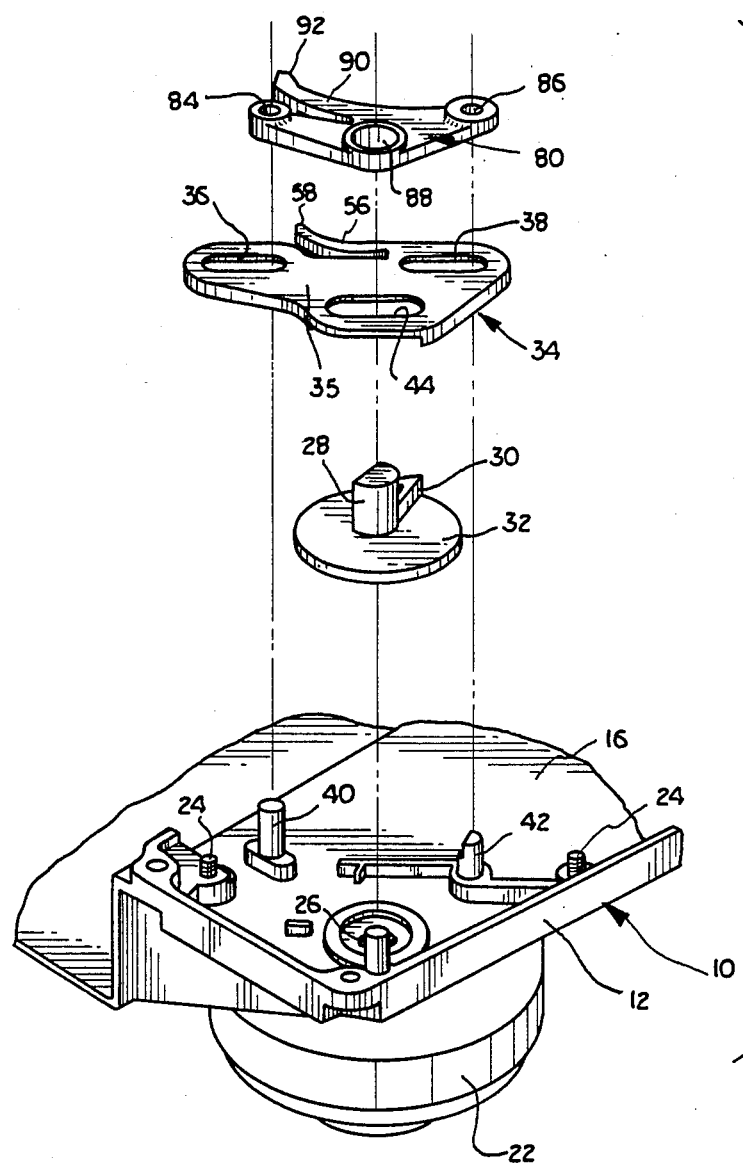
FIG. 2 is a fragmentary, exploded view of the cam drive mechanism according to this invention.

Referring now to the drawings, and particularly to FIG. 1, there is illustrated a sequential timer 10 for appliances such as dishwashers, clothes washers, clothes dryers, and the like, which includes a casing 12. The casing 12 comprises two identical and mating halves 14 and 16, which cooperate to form a relatively narrow chamber 18. The mating halves 14 and 16 are held together by a plurality of bolts or screws 20. A synchronous motor 22 (FIG. 2) is mounted on the casing half 16 by fasteners 24, and has an output shaft 26 which is keyed to and drives a camshaft 28 through a gear train (not shown) at a very slow rate of speed. The camshaft 28 has an advancing and retracting cam 30 which extends from the camshaft 28 and is molded into the face of a supporting disc 32.

The cam 30 cooperates with and drives a shuttle 34 in a rectilinear manner along a path which is tangent to a cam disc 62. The shuttle 34 has a body 35 which is provided with a pair of elongated apertures 36 and 38 which respectively receive stationary pins 40 and 42, which are molded into and project from the casing half 16. An additional aperture 44 receives the camshaft 28. As may be seen in FIGS. 3 through 6, the cam 30 includes a cam surface 46 which curves from the arcuate surface of the camshaft 28 in such a manner that at least portions of the surface 46 extend beyond any zone bounded by imaginary parallel lines which are tangent to the camshaft 28.

Figure 3:
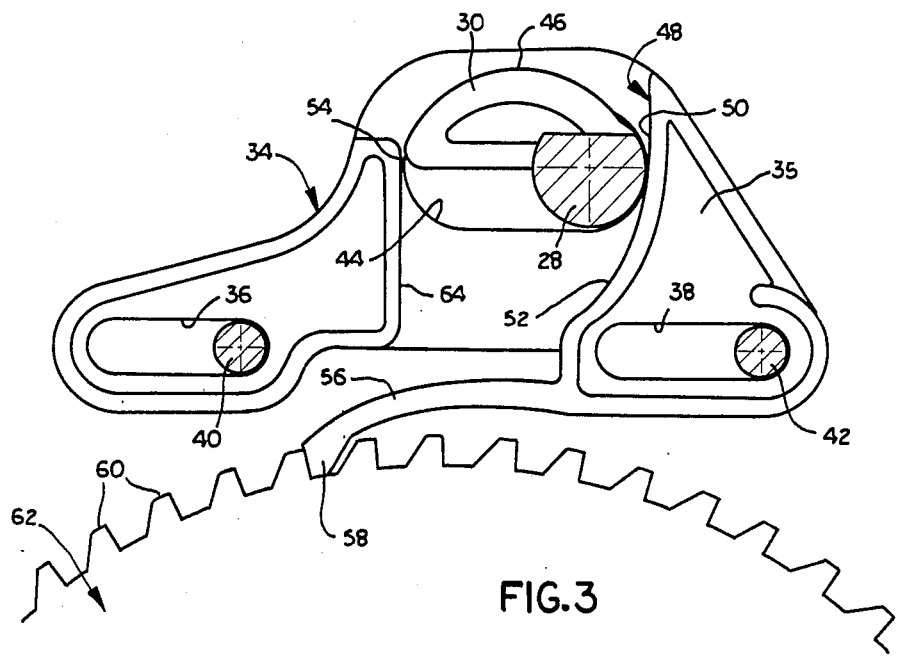
FIGS. 3 through 6 are plan views of the cam drive mechanism according to this invention, showing the mechanism in successive positions during a cycle of its operation.
Figure 4:
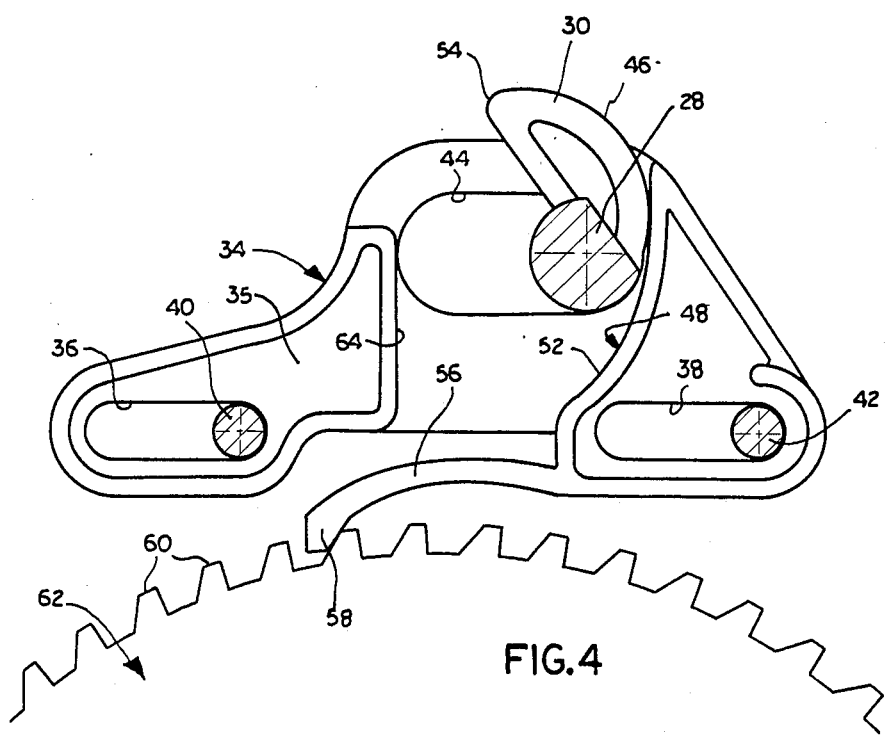
Figure 5:
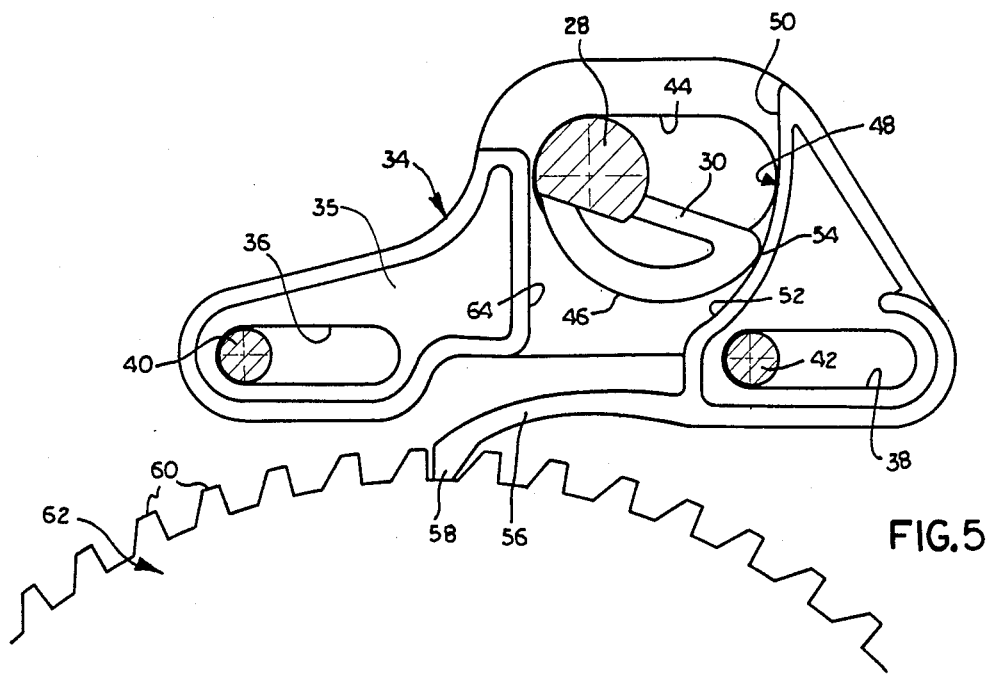
Figure 6:
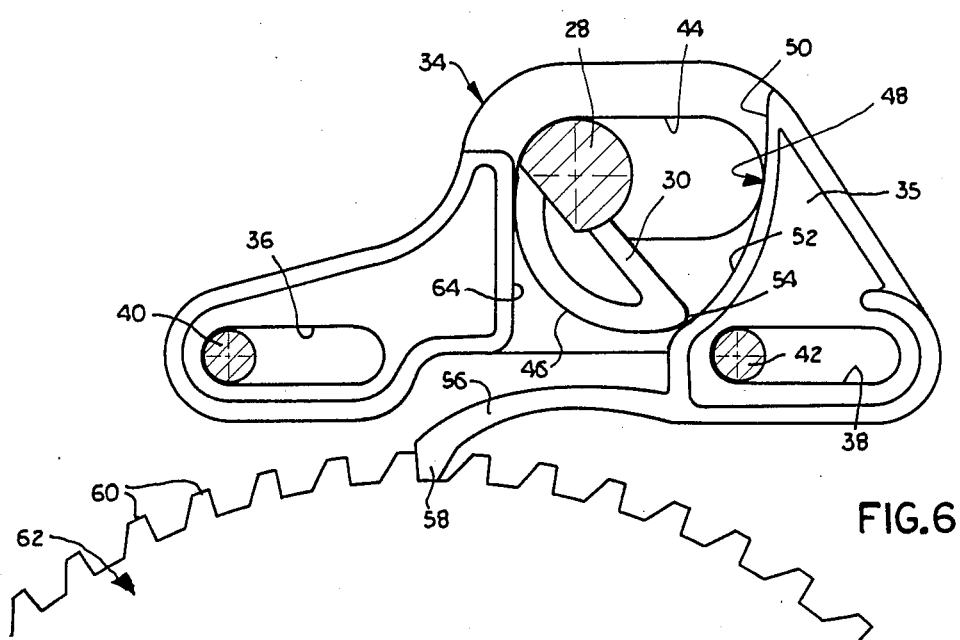

The shuttle 34 is reciprocated between the position illustrated in FIGS. 3 and 5 by the engagement of the cam surface 46 with a cam surface 48 on the shuttle 34. The cam surface 48 includes a straight surface 50 which extends from a point of tangency between the cam surface 48 and the camshaft 28, and by an arcuate surface 52 which extends from the aforementioned point of tangency. The curve of the surface 52 is defined by a radius corresponding to a line between the center of the camshaft 28 and a tip 54 of the cam 30. Thus, as the cam surface 46 engages the surface 50, as illustrated in FIG. 4, the shuttle 34 is driven to the right, as viewed in FIGS. 3 through 6. As the shuttle 34 is reciprocated in this manner, a cantilever pawl arm 56 having a pawl tooth 58 is ratcheted over one of a multiplicity of teeth 60 provided on the cam disc 62. As the tip 54 of the surface 46 traverses the arcuate cam surface 52, the pawl 58 tends to dwell in its retracted position at the end of its retraction stroke. During traversal of the tip 54 along the cam surface 52, the shuttle 34 is positively restrained from any reciprocating movement, as may be seen in FIG. 5.

As the tip 54 leaves the cam surface 52, the cam surface 46 engages a cam surface 64 on the shuttle 34 to drive the shuttle 34, and therefore the pawl tooth 58, in a forward stroke to advance the cam disc 62 in a counterclockwise direction an angular distance corresponding to the circumferential width of one of the teeth 60.

Figure 7:
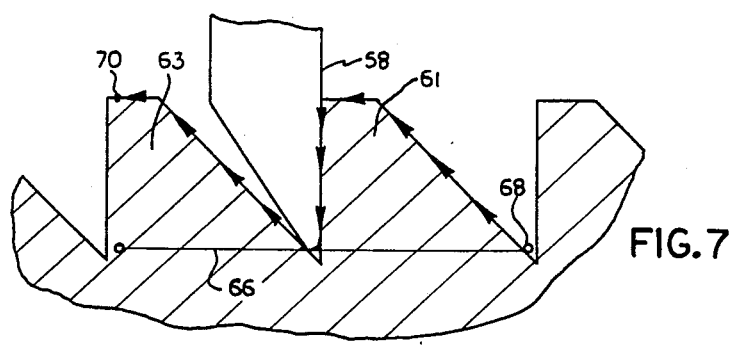
FIG. 7 is a schematic representation of the path of travel of a pawl relative to one set of ratchet teeth.

While the extent of the stroke of the pawl tooth 58 is determined by the spacing between the cam surfaces 50 and 64 and the distance between the tip 54 and the center of the camshaft 28, and while the stroke distance is a fixed value, the degree to which the cam disc 62 is advanced is dependent upon the spacing between adjacent teeth 60. Thus, referring now to FIGS. 7 and 8, it may be noted that the theoretical path of travel of the pawl 58 is represented by the line 66, i.e., the path of travel of the pawl tooth 58, ignoring interference by the teeth 60. In FIG. 7, the actual path of travel is from a point 68 to a point 70 and along the periphery of one ratchet tooth 61 and along a portion of an adjacent tooth 63, as indicated by the arrows. The teeth 61 and 63 illustrated in FIG. 7 are the smallest teeth in terms of arcuate extent that the pawl tooth 58 may traverse, assuming a degree of travel indicated by the line 66, since any further travel would advance the cam disc 62 a total distance corresponding to the thickness of two teeth. As is illustrated, however, the cam disc 62 would dwell as the pawl tooth 58 advances from the point 70 to the illustrated position and would then be advanced as the pawl tooth 58 is advanced from its illustrated position to the point 68. Thus, the total arcuate travel of the cam disc 62 during one stroke of the pawl tooth 58 corresponds to the thickness of a tooth measured at its base.

Figure 8:
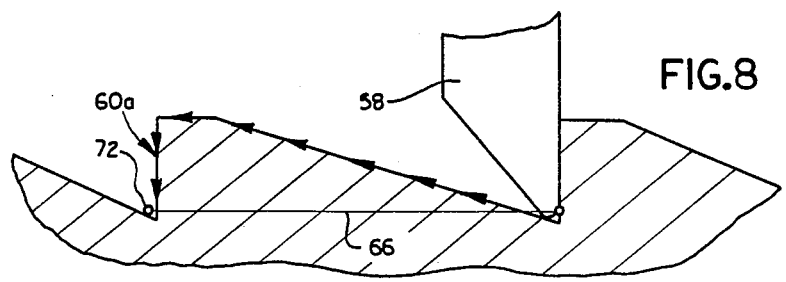
FIG. 8 is a schematic representation of the path of travel of a pawl relative to another set of ratchet teeth.

As may be seen in FIG. 8, the theoretical path of travel of the pawl 58 is identical to the path of travel 66 illustrated in FIG. 7. However, the thickness of a tooth 60a is almost twice the thickness of the tooth 60, illustrated in FIG. 7. The actual path of travel of the pawl tooth 58 is from its illustrated position to a point 72 along only one ratchet tooth 60a, so that there is substantially no lost motion of the pawl tooth 58 relative to the cam disc 62 upon the advancement stroke of the pawl tooth 58.

Thus, it may be appreciated that for single tooth advancement, the thickness of a tooth should be no greater than the distance traveled by the shuttle 34, and no less than one-half that distance. Any tooth size between these limits may be employed, and any such tooth size may be randomly placed along the periphery of the cam disc 60. These features enable the cam disc to be rapidly advanced through certain portions of its rotative cycle by arranging relatively large teeth 60a along the periphery of the cam segment and permits a relatively slow advance of the cam disc by arranging the teeth 60 along those segments of the disc which are to be slowly advanced.

Retraction of the pawl tooth 58 along the sloped sides of a tooth 60 or 60a tends to cause the cam disc 62 to rotate in a direction opposite its desired driven direction. Such rotation is arrested by a no-back pawl which comprises a base portion 80 (FIGS. 1 and 2) mounted on the pins 40, 42, and the camshaft 28 which respectively extend through apertures 84, 86, and 88 in the base 80. The base 80 is further provided with a cantilever spring arm 90 having a pawl tooth 92 at its distal end. The tooth 92 is biased into engagement with the teeth 60 or 60a, and prevents any retraction of the disc cam 62 counter to its desired driven direction.

While the invention has been shown and described with respect to a particular embodiment thereof, this is for the purpose of illustration rather than limitation, and other variations and modifications of the specific embodiment herein shown and described will be apparent to those skilled in the art, all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. In an incremental drive mechanism for a switch operating timing cam comprising a housing means, a main program cam, and drive means including a constant speed motor, said program cam having a set of circularly arranged one-way ratchet teeth having arcuate widths on its periphery, in combination therewith, the improvement comprising drive pawl means for driving said program cam in a step-by-step manner by engagement of successive ratchet teeth, said drive pawl means including camshaft means rotationally driven by said motor, said camshaft means having a periphery defining a radially extending cam, a slide rectilinearly driven by contact with said radially extending cam in a direction substantially tangential to said circularly arranged ratchet teeth, guide means on said housing confining said slide to rectilinear motion, said slide having a body portion and a pawl arm portion, said pawl arm portion comprising a cantilever spring arm having a pawl tooth at its distal end biased into engagement with said ratchet teeth, the body portion of said slide having a first cam follower surface and a second cam follower surface, said first cam follower surface and said second cam follower surface being spaced apart and facing each other, said radially extending cam being positioned between said first cam follower surface and said second cam follower surface so that said first cam follower surface and said second cam follower surface are sequentially engageable by said radially extending cam, said first cam follower surface, when engaged by said cam, causing said slide to be driven rectilinearly and said pawl to be driven along a rectilinear path in a first direction tangential to said ratchet teeth to drive said teeth and the program cam through an arc corresponding to the arcuate width of an engaged tooth, said second cam follower surface, when engaged by said cam, causing said slide to be driven rectilinearly and said pawl to be driven along a path in a second direction following the contour of at least one ratchet tooth as said pawl is biased against said at least one ratchet tooth by said cantilever spring arm, and means to prevent said ratchet teeth from moving in said second direction as said pawl is moving in said second direction.

2. An improvement to an incremental drive mechanism according to claim 1, wherein said first and second cam follower surfaces are engaged by said radially extending cam during a major portion of a revolution of said camshaft.

3. An improvement to an incremental drive mechanism according to claim 2, wherein said radially extending cam extends beyond any zone bounded by imaginary parallel lines which are tangent to said camshaft.

4. An improvement to an incremental drive mechanism according to claim 3, wherein said first cam surface is a straight surface and wherein said second cam surface is comprised of a straight portion and a curved portion.

5. An improvement to an incremental drive mechanism according to claim 4, wherein said curved portion has a radius of curvature corresponding to the distance between the center of said camshaft and a tip of said radially extending cam.

6. An improvement to an incremental drive mechanism according to claim 1, wherein said arcuate width of an engaged tooth is less than the length of said rectilinear path and greater than one-half the length of said rectilinear path.

7. An improvement to an incremental drive mechanism according to claim 1, wherein the path of said pawl tooth in said second direction is along one ratchet tooth and a portion of an adjacent ratchet tooth.

8. An improvement to an incremental drive mechanism according to claim 1, wherein the path of said pawl tooth in said second direction is along only one ratchet tooth.

* * * * *